Dec. 5, 1933. B. H. COFFEY Re. 19,014

DEVICE FOR COOLING WATER

Original Filed Dec. 5, 1925

Inventor
Barton H. Coffey
By his Attorney
Andrew Smith Jr.

Reissued Dec. 5, 1933

Re. 19,014

UNITED STATES PATENT OFFICE 19,014

DEVICE FOR COOLING WATER

Barton H. Coffey, Elizabeth, N. J., assignor to The Cooling Tower Co. Inc., New York, N. Y., a corporation of New York Original No. 1,762,762, dated June 10, 1930, Serial No. 73,458, December 5, 1925. Application for reissue October 24, 1930. Serial No. 491,063

5 Claims. (Cl. 261—117)

My invention has relation to new and useful improvements in devices for cooling water and the like and the primary object of my invention is to provide an effective and economical device for cooling water and the like; another object of my invention is to provide a device of the character described of a minimum weight; another object of my invention is to minimize the energy necessary to maintain the air current in the device.

I accomplish this object by the device illustrated in the accompanying drawing.

The invention consists in the improvements fully described hereinafter and the novelty of which will be particularly pointed out and distinctly claimed.

Figure 1:
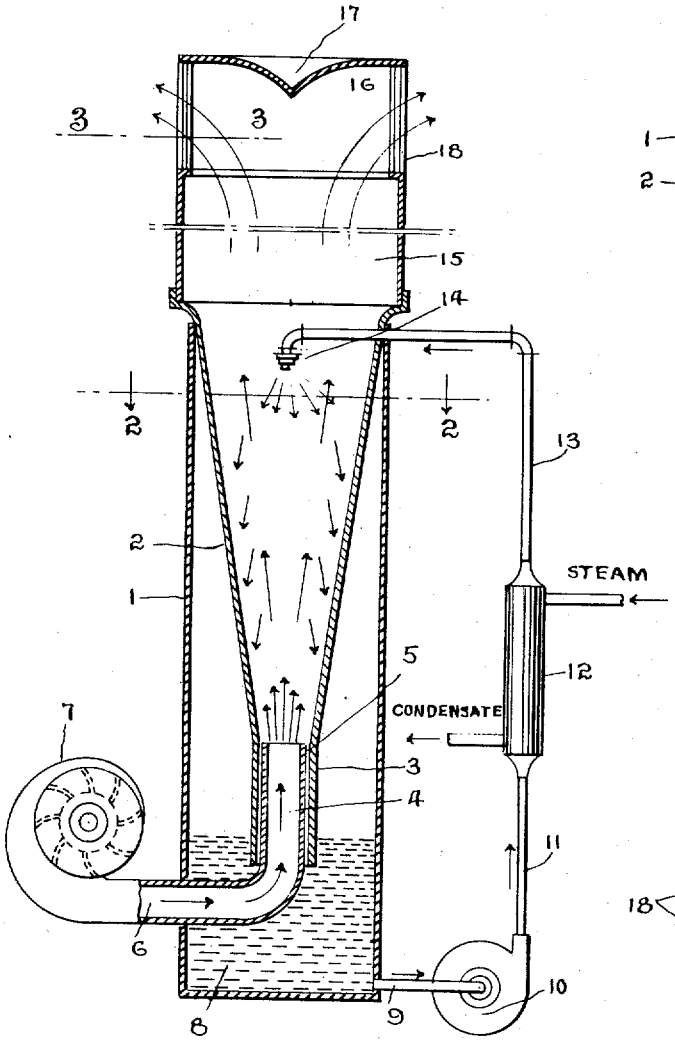
Figure 2:
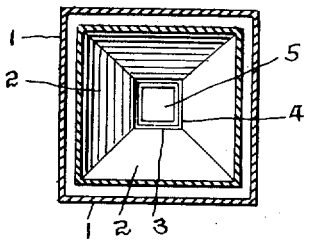
Figure 3:
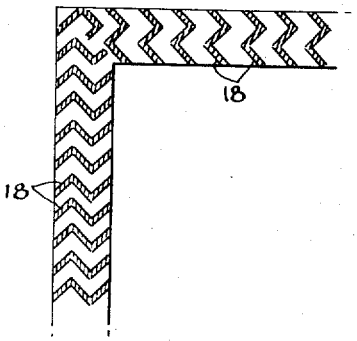

I have fully and clearly illustrated my invention in the accompanying drawing to be taken as a part of this specification and wherein:

Figure 1 is a sectional elevation of the device with a schematic diagram of the cooling system, Figure 2 is a cross section on the line 2—2 in Figure 1, and Figure 3 is a detail of the eliminator screen, on the line 3—3 in Figure 1.

Similar characters refer to similar parts throughout the several views.

Before proceeding with the detail description of my invention, I would state that it is shown as applied to a system in which there is a continuous circulation of the water through the plant or surface condenser where it becomes heated and is then returned to the cooling device from which, after the desired reduction of temperature, it is again delivered to the plant. By the term "diverging tube" as employed herein, is meant a diverging conduit having an angle of divergence that will cause it to transform velocity head to pressure head in a stream of fluid passing from the smaller end to the large end. In diverging tubes there is a critical angle at which failure to function as a Venturi tube is abrupt. For water discharging to atmospheric pressure, the critical angle is 7° 30′, at greater angles the jet jumps free and the discharge at the given head is governed by the small diameter, the flow necessarily decreasing.

Referring to the drawing by characters of reference, 1 is a frame work of any suitable character by which is supported the cooling draft tube in the form of an inverted truncated tube 2 having flaring sides positioned at an angle of approximately six degrees to the vertical as will be hereinafter more particularly explained, which forms a diverging tube possessing the qualities of the upstream or diverging side of a Venturi tube, and which is preferably provided with a mouth 3 having vertical sides. In the mouth 3 I provide an air nozzle 4 slightly smaller in cross section than the mouth 3 of the tube whereby an annular passage 5 is provided exteriorly of the nozzle 4 and within the mouth 3. A duct 6 leads from a blower 7 to the air nozzle 4. At a suitable location such as the lower part of the frame 1 is provided means for collecting the water which may be a tank 8 or the like but this tank 8 may be entirely omitted as conditions may require.

The cooled water is led by means of a duct 9 to a circulating pump 10 from which it is carried by a duct 11 or the like to the plant or source of heat such as a surface condenser 12 or the like where the water becomes heated and is then carried by a suitable duct 13 to a spray nozzle 14 which is preferably centrally located in the upper part of the tube 2. Above the tube 2 I provide a stack 15 of such height as conditions may require and above the stack 15 I preferably provide a cap 16 having a roof or cover 17 and open sides in which I preferably set vertical, angularly disposed slats or eliminators 18, 18 so arranged that the air passing out of the tower will strike against the said slats 18.

The device being thus assembled, the water will be driven by the pump 10 through the condenser 12 and ducts 11 and 13 to the spray nozzle 14 which is of any desired type adapted to break up the water into spray.

The water from the nozzle 14 will be met by the air delivered by the blower 7 through the duct 6 to the air nozzle 4.

I preferably admit this air at a velocity of approximately 2000 feet per minute at which velocity no falling water is permitted to enter the open air nozzle 4. The walls of the tube 2 preferably diverge at an included angle of approximately twelve to twenty four degrees whereby I effect a maximum economy of power and attain a high efficiency of the circulating air which is well understood in the Venturi tube art. The tube 2 serves as a diverging and diffusing discharge orifice which gradually reduces the air velocity and correspondingly reduces the kinetic energy in the moving air mass and thus reduces the energy necessary to maintain the air current. The water from the nozzle 14 is driven by the force of the incoming air to the sides of the draft tube 2 and runs down the sides thereof being cooled by this process and is collected and carried off at the bottom by means of the tank 8 or in any desired manner. The air in its upward passage through the draft tube 2 and the stack 15 will gradually lose its high velocity and its capacity for carrying the water from the nozzle 14 and such water as may still be carried by the air as it passes out of the top 16 of the device through the slats or eliminators 18 will be collected from the air by the said slats or eliminators 18 and will run down the inner face of the stack 15 and draft tube 2 to the collecting tank 8 so that the air which passes out through the eliminators 18 will carry no spray. I prefer to construct my said device of square or rectangular form whereby each will form a unit adapted to be set up in batteries of two or more units.

Having thus described my invention, what I claim is:

1. In a device of the character described, the combination of a diverging tube provided with a mouth having vertical sides, an air nozzle in the said mouth, an annular passage exterior of the nozzle and within the mouth, means for delivering a spray of water within the upper part of said tube, means for discharging air from the air nozzle at a velocity sufficient to prevent the water from entering the air nozzle whereby the water is caused to run down the sides of the tube between the mouth of the tube and the air duct, means for collecting the water and means to convey water from said collecting means to said delivering means.

2. In a device of the character described the combination of a diverging tube having a mouth at its lower end, an air duct therein and adapted to deliver air at high velocity within the mouth of the tube, means for delivering a spray of water to be cooled within the upper part of the tube, a stack above the tube provided with eliminators adapted to collect water from the air passing out of the stack, means for collecting said water, and means for redelivering said water to said first named means.

3. In a mechanical draft cooling tower, the combination of a vertically disposed diverging tube, the walls of which diverge at an included angle of approximately twelve to twenty-four degrees, a mouth having vertical walls at the smaller end of said tube, an air nozzle substantially filling said mouth, means for discharging water to be cooled in the upper large portion of the said tube in the form of finely divided spray, and means for admitting air, through said nozzle, at a velocity of approximately 2000 feet per minute.

4. In a device of the character described, the combination of a vertical diverging tube the walls of which diverge at an included angle of approximately twelve degrees to twenty-four degrees whereby velocity head will be transformed to pressure head in a current of air passing from the smaller end to the larger end of the tube, an air inlet nozzle substantially filling the smaller end of said tube, means for delivering water in the form of spray in the larger portion of the tube and means for admitting air at high velocity through said air inlet nozzle at the smaller portion of the said tube.

5. In a device of the character described, the combination of a tube possessing the characteristics of a Venturi diverging tube, a mouth at the smaller end of the tube and having vertical sides, an air inlet nozzle substantially filling the said mouth and slightly spaced from its sides, a spray nozzle in the upper part of the said tube, and means for discharging air to the tube at high velocity through said air nozzle.

BARTON H. COFFEY.